(12) United States Patent
Park et al.

(10) Patent No.: US 12,036,508 B2
(45) Date of Patent: Jul. 16, 2024

(54) NITROGEN OXIDE REDUCTION TYPE REGENERATIVE THERMAL OXIDATION SYSTEM AND NITROGEN OXIDE REDUCTION METHOD THEREOF

(71) Applicant: EMSOLUTION Co., Ltd, Suwon-si (KR)

(72) Inventors: Hoon Min Park, Yongin-si (KR); Dal Hwan Yoon, Jecheon-si (KR); Dong Hwan Jeon, Yongin-si (KR); Heung Ki Min, Seongnam-si (KR)

(73) Assignee: EMSOLUTION Co., Ltd, Suwon-si (KR)

( * ) Notice: Subject to any disclaimer, the term of this patent is extended or adjusted under 35 U.S.C. 154(b) by 0 days.

(21) Appl. No.: 17/901,278

(22) Filed: Sep. 1, 2022

(65) Prior Publication Data

US 2023/0228205 A1 Jul. 20, 2023

(30) Foreign Application Priority Data

Jan. 25, 2022 (KR) .................. 10-2022-0011055

(51) Int. Cl.
*B01D 53/56* (2006.01)
*B01D 53/86* (2006.01)
(Continued)

(52) U.S. Cl.
CPC ......... *B01D 53/56* (2013.01); *B01D 53/8625* (2013.01); *F01N 3/20* (2013.01);
(Continued)

(58) Field of Classification Search
CPC ............ B01D 53/56; B01D 53/8625; B01D 2251/2062; B01D 2251/2067
See application file for complete search history.

(56) References Cited

U.S. PATENT DOCUMENTS

2014/0212349 A1* 7/2014 Mulleder ............. F28D 17/00
423/239.1
2018/0214821 A1* 8/2018 Binninger ............ B01D 53/62

FOREIGN PATENT DOCUMENTS

| CN | 210934473 U | * | 7/2020 |
| KR | 100597695 B1 | * | 7/2006 |
| KR | 20140134159 A | | 11/2014 |

OTHER PUBLICATIONS

Machine translation of CN-210934473-U accessed Jun. 9, 2023. (Year: 2023).*

* cited by examiner

*Primary Examiner* — Jonathan R Matthias
(74) *Attorney, Agent, or Firm* — Boyle Fredrickson, S.C.

(57) ABSTRACT

A nitrogen oxide reduction type regenerative thermal oxidation system and a method for nitrogen oxide reduction thereof are disclosed. The nitrogen oxide reduction type regenerative thermal oxidation system according to the present invention is characterized by comprising: a first reduction device for primarily reducing nitrogen oxides generated by a regenerative thermal oxidation device based on a selective non-catalytic reduction method; an exhaust gas storage device for storing the exhaust gas being discharged from the regenerative thermal oxidation device; a second reduction device for secondarily reducing nitrogen oxides based on a selective catalytic reduction method for an exhaust gas stored in the exhaust gas storage device; and a suction and discharge device for sucking in the exhaust gas with secondarily reduced nitrogen oxides from the exhaust gas storage device and discharging it into the atmosphere.

8 Claims, 2 Drawing Sheets

(51) Int. Cl.
*F01N 3/20* (2006.01)
*F01N 3/26* (2006.01)
(52) U.S. Cl.
CPC ........ *F01N 3/26* (2013.01); *B01D 2251/2062* (2013.01); *B01D 2251/2067* (2013.01); *F01N 2240/12* (2013.01); *F01N 2570/14* (2013.01); *F01N 2900/1404* (2013.01); *F01N 2900/1411* (2013.01)

NITROGEN OXIDE REDUCTION TYPE REGENERATIVE THERMAL OXIDATION SYSTEM AND NITROGEN OXIDE REDUCTION METHOD THEREOF

CROSS REFERENCE TO RELATED APPLICATIONS

This application claims benefit of priority of Korean Patent Application No. KR 10-2022-0011055, filed on Jan. 14, 2022, the contents of which are hereby incorporated by reference.

TECHNICAL FIELD

The present invention relates to a nitrogen oxide reduction type regenerative thermal oxidation system and a method for nitrogen oxide reduction thereof, and more particularly, relates to a nitrogen oxide reduction type regenerative thermal oxidation system and a method for nitrogen oxide reduction thereof capable of remarkably reducing nitrogen oxides generated in a regenerative oxidation device.

BACKGROUND ART

Recently, a regenerative thermal oxidation (RTO) device that stores heat of exhaust gas by direct contact and reuses the stored heat has been widely used.

The regenerative thermal oxidation is the same process as a general incinerator that treats volatile organic compound (VOC) and organic odor gas at a high temperature of about 800° C. It is a regenerative incinerator which is a high efficiency energy saving facility that has a great energy saving effect by recovering up to 95% using a ceramic heat storage agent, not a general heat exchanger such as a fin-tube or a plate type, and by using it to preheat the process exhaust gas.

The regenerative thermal oxidation device has two or more heat storage chambers, the gas flow is alternately exchanged, and the heat storage agent is filled with metal or ceramic.

Figure 1:
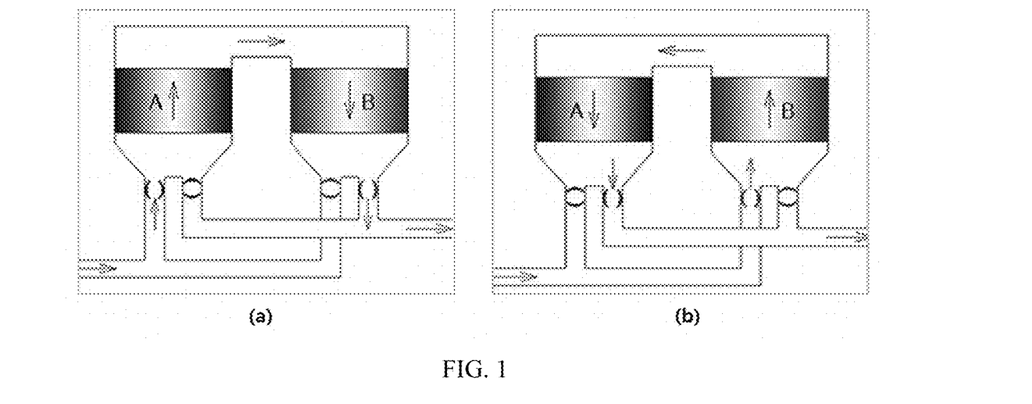
FIG. 1 is a diagram illustrating the concept of a regenerative thermal oxidation device.

FIG. 1 is a diagram illustrating the concept of a regenerative thermal oxidation device.

In order for the regenerative thermal oxidation device to operate, a valve device is required so that the flow direction of the gas flowing into the RTO ceramic bed is bi-directionally switched to the left and right.

First, looking at the first case (heat storage chamber A is cooling, heat storage chamber B is heating) (FIG. 1 (a)), after heating the temperature of the upper portion of the ceramic layer in the incinerator becomes the operating temperature of the incinerator at an initial state of operation, a pretreatment gas is introduced in the direction from A to B. At this time, the temperature of the gas is preheated to the incinerator temperature while passing through the ceramic in the heat storage chamber A, and the organic gas contained in the gas starts to be oxidized and passes through the upper chamber having an appropriate residence time, and all organic matters are oxidized. In addition, the treated high-temperature gas stores almost all of the heat in the ceramic of the heat storage chamber B and since it is discharged at a temperature 30~50° C. lower than the ceramic inlet temperature of the heat storage chamber A, the total calorie loss is very small.

Next, looking at the second case (heat storage chamber A is heating, heat storage chamber B is cooling) (FIG. 1 (b)), after a certain time elapses, the ceramic of the heat storage chamber A is cooled by preheating the suction gas, when the ceramic of the heat storage chamber B is accumulated with heat by exhaust gas, the gas inlet flow path is changed from B to A, and this process of changing the inlet flow path is referred to as switching, and the switching operation is sequentially repeated at regular time intervals in the plurality of ceramic layers.

As the inlet/outlet flow path of organic gas is changed during switching, in order to prevent the untreated gas existing in the RTO system from being discharged to the outside of the system, a purge process is performed in at least one of the plurality of ceramic beds. The organic gas treatment efficiency of the multiple-bed RTO including the purge process is 99% or more.

However, since the regenerative thermal oxidation device operates with high-temperature combustion air, there is a problem in that the amount of nitrogen oxide ($NO_x$) generated due to high-temperature combustion during combustion is increased.

PRIOR ART LITERATURE

Patent Literature

Korean Patent Laid-Open Publication No. 10-2014-0134159 (published date: Nov. 21, 2014)

DETAILED DESCRIPTION OF THE INVENTION

Technical Subject

The present invention has been devised to solve the above problems, an object of the present invention is to provide a nitrogen oxide reduction type regenerative thermal oxidation system and a nitrogen oxide reduction method therefor which can significantly reduce nitrogen oxides being generated in a regenerative thermal oxidation device.

Technical Solution

A nitrogen oxide reduction type regenerative thermal oxidation system according to an aspect of the present invention for achieving the above object is characterized by comprising: a first reduction device for primarily reducing nitrogen oxides generated by a regenerative thermal oxidation device based on a selective non-catalytic reduction method; an exhaust gas storage device for storing the exhaust gas being discharged from the regenerative thermal oxidation device; a second reduction device for secondarily reducing nitrogen oxides based on a selective catalytic reduction method for an exhaust gas stored in the exhaust gas storage device; and a suction and discharge device for sucking in the exhaust gas with secondarily reduced nitrogen oxides from the exhaust gas storage device and discharging it into the atmosphere.

The regenerative thermal oxidation system described above may include: a temperature sensor for measuring the temperature of an exhaust gas stored in the exhaust gas storage device; and a temperature control device for controlling the temperature of an exhaust gas stored in the exhaust gas storage device to the preset temperature when the temperature measured by the temperature sensor is lower than the preset temperature.

Here, when the temperature being measured by the temperature sensor is lower than a preset set temperature, it is preferred that the temperature control device controls the temperature so that the exhaust gas stored in the exhaust gas storage device reaches the set temperature within a set time.

The above-described regenerative thermal oxidation system may further include an emission control device for controlling the amount of exhaust gas discharged from the regenerative thermal oxidation device to the exhaust gas storage device per unit time.

In a nitrogen oxide reduction method being performed by a regenerative thermal oxidation system, the nitrogen oxide reduction method according to an aspect of the present invention for achieving the above object is characterized by comprising the steps of: primarily reducing nitrogen oxides being generated by a regenerative thermal oxidation device based on a selective non-catalytic reduction method; storing an exhaust gas being discharged from the regenerative thermal oxidation device; secondarily reducing nitrogen oxides based on a selective catalytic reduction method for the exhaust gas that has been stored; and sucking an exhaust gas in which nitrogen oxides is secondarily reduced and discharging it into the atmosphere.

The above-described nitrogen oxide reduction method may further include the steps of: measuring the temperature of the exhaust gas that has been stored; and controlling the temperature of the exhaust gas that has been stored to the set temperature when the temperature being measured is lower than a preset set temperature.

Here, when the measured temperature is lower than the preset set temperature, in the step of controlling the temperature of the exhaust gas to the set temperature, it is preferable to control the temperature in a way that the exhaust gas that has been stored reaches the set temperature within a set time.

The above described nitrogen oxide reduction method may further include a step of controlling the amount of discharge of an exhaust gas being discharged from the regenerative thermal oxidation device per unit time.

Advantageous Effects

According to the present invention, nitrogen oxides generated by a regenerative thermal oxidation device can be primarily removed using a selective non-catalytic reduction method and secondarily removed using a selective catalytic reduction method, thereby possibly improving the reduction efficiency of nitrogen oxides.

BEST MODE

Hereinafter, some embodiments of the present invention will be described with reference to exemplary drawings. In describing the reference numerals for the components of each drawing, the same components are denoted by the same reference numerals as much as possible even though they are displayed on different drawings. In addition, in describing the embodiment of the present invention, if it is determined that a detailed description of a related known configuration or function interferes with the understanding of the embodiment of the present invention, the detailed description thereof will be omitted.

In addition, in describing the components of the embodiment of the present invention, terms such as first, second, A, B, (a), and (b) may be used. These terms are merely intended to distinguish the components from other components, and the terms do not limit the nature, order or sequence of the components. When a component is described as being "connected", "coupled" or "interconnected" to another component, the component may be directly connected, coupled, or interconnected to the other component, but it should be understood that another component may be "connected", "coupled" or "interconnected" between the component and the other component.

The generation of nitrogen oxides $NO_x$ in combustion furnaces using fossil fuels such as coal is an inevitable and unavoidable problem. In general, nitrogen as a starting material of $NO_x$ being discharged when burning fossil fuels can be largely divided into nitrogen in the fuel (Fuel-N) and nitrogen in the atmosphere ($N_2$). In addition, $NO_x$ can be classified into thermal-$NO_x$, prompt-$NO_x$, and fuel-$NO_x$ according to the form converted from the starting material.

Here, thermal-NOx is nitrogen oxide produced by rapid oxidation of nitrogen at a combustion temperature of 1800K or higher, from nitrogen in the air, and is produced by the following reaction which is referred to as the Zeldovich mechanism.

$$N_2 + O \Leftrightarrow NO + N \qquad 1)$$

$$O_2 + N \Leftrightarrow NO + O \qquad 2)$$

$$N + OH \Leftrightarrow NO + H \qquad 3)$$

When observing the process of NO production in the laminar flow premixed flame for prompt-$NO_x$, NO is gradually generated downstream of the flame zone in a fuel-lean flame, but most of the NO is generated in the flame zone in a fuel-rich flame. At this time, HCN production is seen in the first half of the flame zone, and NO is produced as HCN decreases in the second half. In the lean flame, it can be seen that NO is generated by the Zeldovich mechanism of 1) to 3), and in the rich flame, it can be seen that NO is generated during the chain reaction of combustion. In this way, $NO_x$ that is generated rapidly by a path other than the Zeldovich mechanism while originating from nitrogen in the air is referred to as prompt $NO_x$. Its generation concentration is maximized at an equivalence ratio of 1.2 to 1.4, and is usually about 60 to 80 ppm, except for 100 ppm of benzene and 300 ppm of acetylone.

As described above, the prompt $NO_x$ generation reaction is included in the combustion chain reaction, but the comprehensive generation mechanism is as follows. That is, during the thermal decomposition of hydrocarbons (1), CH and $CH_2$ are generated, and these react with nitrogen in the air to generate HCN, N, and NH through the processes of steps 4) and 5).

$$N_2 + CH \Leftrightarrow HCN + N \qquad 4)$$

$$N_2 + CH_2 \Leftrightarrow HCN + NH \qquad 5)$$

N is changed to NO by reaction 2) and reaction 3), and also HCN and NH are changed to NO through a series of reactions. Many reactions involved in instantaneous $NO_x$ generation have low activation energy, and no significant change in the amount of formation is seen even when the temperature is lowered.

Whereas thermal-$NO_x$ and prompt-$NO_x$ originate from nitrogen in the air, fuel-$NO_x$ originates from nitrogen in the fuel (also referred to as fuel N). Nitrogen content is 0.2 to 3.4% in coal and 0.1 to 0.4% in bunker C oil, and by-product gas and coal gas are also contained in the form of ammonia and hydrogen cyanide. Nitrogen content is rapidly converted to $NO_2$ in the flame zone and immediately thereafter, which is referred to as fuel-$NO_x$. In addition, the ratio of the nitrogen content to fuel-$NO_x$ change is referred to as the conversion rate, and is defined by the following formula.

$$\text{Conversion rate} = \frac{\text{Fuel-Nmber of moles generated } NO_x}{\text{Nmber of gatoms in Nitrogen}} \quad \text{[Equation 1]}$$

The conversion rate is higher at higher temperatures and higher oxygen concentrations, in some cases exceeding 80%. However, the temperature dependence is not higher than that of thermal-$NO_x$. In addition, when the content of nitrogen content is high, the conversion rate tends to decrease, and the conversion rate, which was around 80% at the content rate of 0.1%, drops to about several tens of % at the content rate of 5%.

The fuel-$NO_x$ generating mechanism is known as follows. First, nitrogen is decomposed in the flame zone and changed to $NH_i$ (i=0~2). Therefore, $$NH_i + OH \Leftrightarrow NO + H_{i+1} \quad 6)$$

Or, NO is produced by reaction 2). Also, NO is converted to $N_2$ by reaction 7).

$$NH_i + NO \Leftrightarrow N_2 + H_iO \quad 7)$$

Then, HCN is produced by reaction 8).

$$NH_i + RCH \Leftrightarrow HCN + RH_i \quad 8)$$

However, R is one of $O_2$, O, and OH. A portion of the generated HCN reacts with OH and decomposes into $NH_i$. The general trend is that the formation of NO is remarkable when the equivalence ratio is 1.4 or less, and the formation of HCN and $NH_3$ is remarkable when the equivalence ratio is 1.4 or more. Since HCN and $NH_3$ are converted to $NO_x$ when oxygen is supplied, $NO_x$ emission is not reduced even if the equivalence ratio is excessively increased. Of course, rather, there is a minimum point of the total amount of NO+HCN+$NH_3$ near the equivalence ratio of 1.3, and the temperature required for decomposition of HCN and NH3 is maintained. A method of performing combustion of (two-stage combustion method) may be performed. At this time, conditions should be set in a way that $NH_i$ generated by the decomposition of HCN and $NH_3$ inhibits the formation of NO at 6) and promotes the decomposition of NO at 7).

Among the methods for suppressing $NO_x$ generation, a method of suppressing NOx generation during combustion as a primary method and a method of removing $NO_x$ in exhaust gas after generation as a secondary method may be considered.

The primary method is economical in terms of low facility investment cost, but in some cases it is difficult to satisfy the legal environmental regulatory requirements, and the secondary method may have technical difficulties for suppressing harmful gas in exhaust gas.

As a method for energy saving in high-temperature industrial furnaces, there is a method of preheating air for combustion. However, the generation of $NO_x$ increases due to the high temperature inside the industrial furnace and the use of air for preheating combustion.

The internal temperature of the industrial furnace is about 1,300° C. or higher, and the preheating temperature of the combustion air is sometimes used from 600° C. to 1,200° C. Recognizing the importance of industrial processes in industrial furnaces, research on $NO_x$ reduction technology using combustors for industrial furnaces has progressed considerably, and as a result, it is true that various types of low $NO_x$ combustors have been developed. An embodiment of the present invention suggests a method for reducing nitrogen oxides for a regenerative thermal oxidation system.

Figure 2:
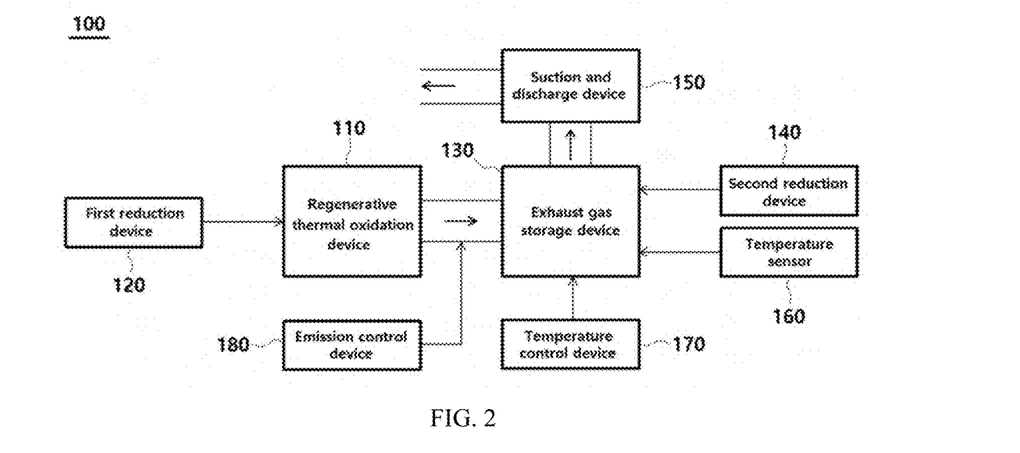
FIG. 2 is a diagram schematically illustrating a nitrogen oxide reduction type regenerative thermal oxidation system according to an embodiment of the present invention.

FIG. 2 is a diagram schematically illustrating a nitrogen oxide reduction type regenerative thermal oxidation system according to an embodiment of the present invention.

Referring to FIG. 2, a nitrogen oxide reduction type regenerative thermal oxidation system 100 according to an embodiment of the present invention may include: a regenerative thermal oxidation device 110; a first reduction device 120; an exhaust gas storage device 130; a second reduction device 140; a suction and discharge device 150; a temperature sensor 160; a temperature control device 170; and an emission control device 180.

The first reduction device 120 primarily reduces nitrogen oxides being generated by the regenerative thermal oxidation device 110 based on a selective non-catalytic reduction method. Here, the regenerative thermal oxidation device 110 may use a regenerative thermal oxidation device according to a known technology, and a detailed description thereof will be omitted here.

Most of industrial heat facilities and power devices have a structure that converts the chemical energy of fossil fuels into thermal energy through a combustion process and uses them. At this time, combustion of fossil fuels inevitably emits nitrogen oxides due to the characteristics of fossil fuels.

Recently, as the importance of the environment has been recognized, emission regulations for nitrogen oxides are being reinforced in advanced countries around the world, and accordingly, research to reduce the level of nitrogen oxides is actively undergoing. As a representative method for reducing the level of nitrogen oxides, there are a selective catalytic reduction (SCR) and a selective non-catalytic reduction (SNCR).

The selective non-catalytic reduction method is used to reduce $NO_x$ emitted from steam generators using fossil fuels, and it is a commercial technology that removes $NO_x$ by spraying ammonia ($NH_3$) or urea in a high temperature range of about 850 to 1100° C. Ammonia and urea are usually sprayed in liquid phase to reduce $NO_x$ to nitrogen gas, water, and the like, and the reaction formula is as follows.

$$4NO + 4NH_3 + O_2 \rightarrow 4N_2 + 6H_2O + HEAT\uparrow$$

$$4NO + 2CO(NH_2)_2 + O_2 \rightarrow 4N_2 + 2CO_2 + 4H_2O + HEAT\uparrow \quad \text{[Reaction formula 1]}$$

In the selective non-catalytic reduction reaction, not only this but also various side reactions occur, a representative example of which is the $NH_3/SO_3$ reaction. Ammonium sulfate generated from this reaction is generated when the temperature in the combustor is low, and causes plugging like debris stuck in automobile pipes. The $NH_3/SO_3$ reaction also produces $NH_4HSO_3$ when the ambient temperature is low, which produces white thorny soot. In addition, when ash and ammonia are adsorbed in the combustor, the occurrence of side reactions should be suppressed as much as possible since it causes ammonia smell during the treatment process.

Since the selective non-catalytic reduction method is simple to install and does not use a catalyst, the initial capital and operating cost are relatively lower than the selective catalytic reduction method. In addition, although component modification of large-scale boiler equipment is relatively easy and there is little downtime, since a narrow range of temperature must be maintained for effective $NO_x$ reduction and no catalyst is used, it is not suitable for large-scale $NO_x$ reduction.

The first reduction device 120 may spray a reduction agent on the regenerative thermal oxidation device 110 through a plurality of atomizers (not shown) installed on the upper inner wall of the regenerative thermal oxidation device 110 so that a reduction reaction for reducing nitrogen oxide occurs at a combustion temperature of 850 to 1,100° C. of the regenerative thermal oxidation device 110. In this case, the regenerative thermal oxidation device 110 operating at a high temperature is denitrified primarily as nitrogen oxide being generated during combustion directly reacts with the reduction agent sprayed by the first reduction device 120. At this time, the first reduction device 120 may select and change the type of reduction agent, the spraying speed of the reduction agent, the spraying amount of the reduction agent, and the like in various ways, and through this, the amount of nitrogen oxides denitrified in the regenerative thermal oxidation device 110 can be varied in various ways. The first reduction device 120 selects and changes the type of reduction agent, the spraying speed of the reduction agent, the spraying amount of the reduction agent, and the like so as to change the amount of nitrogen oxide to be denitrified, and various known techniques can be used to this end, and a detailed description thereof will be omitted here.

The exhaust gas storage device 130 stores the exhaust gas being discharged from the regenerative thermal oxidation device 110. At this time, the exhaust gas storage device 130 stores the exhaust gas being discharged from the regenerative thermal oxidation device 110 until the amount of the exhaust gas becomes a set amount, or may store the exhaust gas being discharged from the regenerative thermal oxidation device 100 for a set time. At this time, the exhaust gas storage device 130 is the cooled exhaust gas after waste heat is recovered by the regenerative thermal oxidation device 110, and the temperature thereof may be 300° C. or less.

The second reduction device 140 secondarily reduces nitrogen oxides based on the selective catalytic reduction method for the exhaust gas being stored in the exhaust gas storage device 130. At this time, the second reduction device 140 supplies a small amount of a reduction agent to the exhaust gas storage device 130, and the exhaust gas storage device 130 may be utilized as a catalytic reaction tower used for the selective catalytic reduction method.

Selective catalytic reduction method is a method for reducing $NO_x$ to $N_2$ and $H_2O$ by selectively reacting $NO_x$ with ammonia on a catalyst, and it is the most commercialized technology as a catalyst that can selectively reduce NOx without being disturbed by $O_2$ in exhaust gas has been developed. The reaction formula for this is as follows.

[Reaction formula 2]

The selective catalytic reduction method is used in a wide range of systems outside of industrial plants and is also used in diesel engines. It improves fuel efficiency of diesel engines and is sometimes used in conjunction with diesel particle filters (DPFs) to reduce particulate matter emissions from diesel engines.

The selective catalytic reduction method has a very high $NO_x$ removal rate of 80-95%, and is performed at a relatively low temperature of 300-380° C. because of the use of a catalyst. The selective catalytic method is relatively easy to control and stable compared to the selective non-catalytic reduction method. However, there are disadvantages in that a high investment cost is required, and the catalyst is easily contaminated by a compound in the combustion gas, so that the replacement cost of the catalyst required for reduction is high.

The second reduction device 140 may calculate the amount of the nitrogen compound contained in the exhaust gas being discharged from the regenerative thermal oxidation device 110 and the amount of the reduction agent consisting of ammonia or urea required for this according to the stoichiometric equivalence ratio. In this case, the second reduction device 140 may adjust the input flow rate, the input amount, and the like of the reduction agent according to the calculated result. The method for the second reduction device 140 to adjust the input flow rate, input amount, and the like of the reduction agent follows a known technique, and a detailed description thereof will be omitted here.

Here, the reduction agent effectively chemically reacts with nitrogen oxides of the exhaust gas discharged from the regenerative thermal oxidation device 110. At this time, it is preferable that the exhaust gas storage device 130 is formed in multiple stages to sufficiently ensure a residence time in which the chemical reaction of nitrogen oxide and the reduction agent can occur, and nitrogen oxide contained in the exhaust gas is reformed into nitrogen and oxygen.

The suction and discharge device 150 sucks the exhaust gas with secondarily reduced nitrogen oxides from the exhaust gas storage device 130 and discharges it to the atmosphere. In other words, the suction and discharge device 150 sucks the exhaust gas reformed into nitrogen and oxygen from the exhaust gas storage device 130 and discharges it to the atmosphere through a chimney (not shown).

The temperature sensor 160 measures the temperature of the exhaust gas stored in the exhaust gas storage device 130.

When the temperature measured by the temperature sensor 160 is lower than the preset temperature, the temperature control device 170 controls the temperature of the exhaust gas stored in the exhaust gas storage device 130 to the preset temperature. Here, it is preferable that the temperature control device 170 controls not only the temperature of the exhaust gas stored in the exhaust gas storage device 130 but also the time at which the exhaust gas reaches a set temperature by using a high heat generating filament. At this time, when the temperature measured by the temperature sensor 160 is lower than the preset set temperature, the temperature control device 170 controls the temperature it is controlled in a way that the exhaust gas stored in the exhaust gas storage device 130 reaches the set temperature within a set time. In this case, the temperature control device 170 may control the time for temperature control in consideration of the amount of exhaust gas, the difference between the exhaust gas and the set temperature, and the like. In addition, the time for temperature control may be controlled in stages according to whether the current temperature of the exhaust gas is lower than the temperature at which the chemical reaction to the reduction agent starts to occur. For example, 300° C. is set as the set temperature for the exhaust gas storage device 130, the current temperature of the exhaust gas measured by the temperature sensor 160 is 100° C., and when the temperature at which the chemical reaction to the reduction agent starts is 200° C., the temperature control device 170 may control the temperature of the exhaust gas in a way that the exhaust gas reaches 200° C. within 30 minutes, and after the exhaust gas reaches 200° C. it is reached to 300° C. within 10 minutes.

The emission control device 180 controls the amount of exhaust gas discharged from the regenerative thermal oxidation device 110 to the exhaust gas storage device 130 per unit time. At this time, the emission control device 180 may control the amount of exhaust gas discharged from the regenerative thermal oxidation device 110 to the exhaust gas storage device 130 per unit time in consideration of the capacity of the gas accommodated in the regenerative thermal oxidation device 110, the capacity of the gas accommodated in the exhaust gas storage device 130, the processing time of the exhaust gas storage device 130, and the like.

Figure 3:
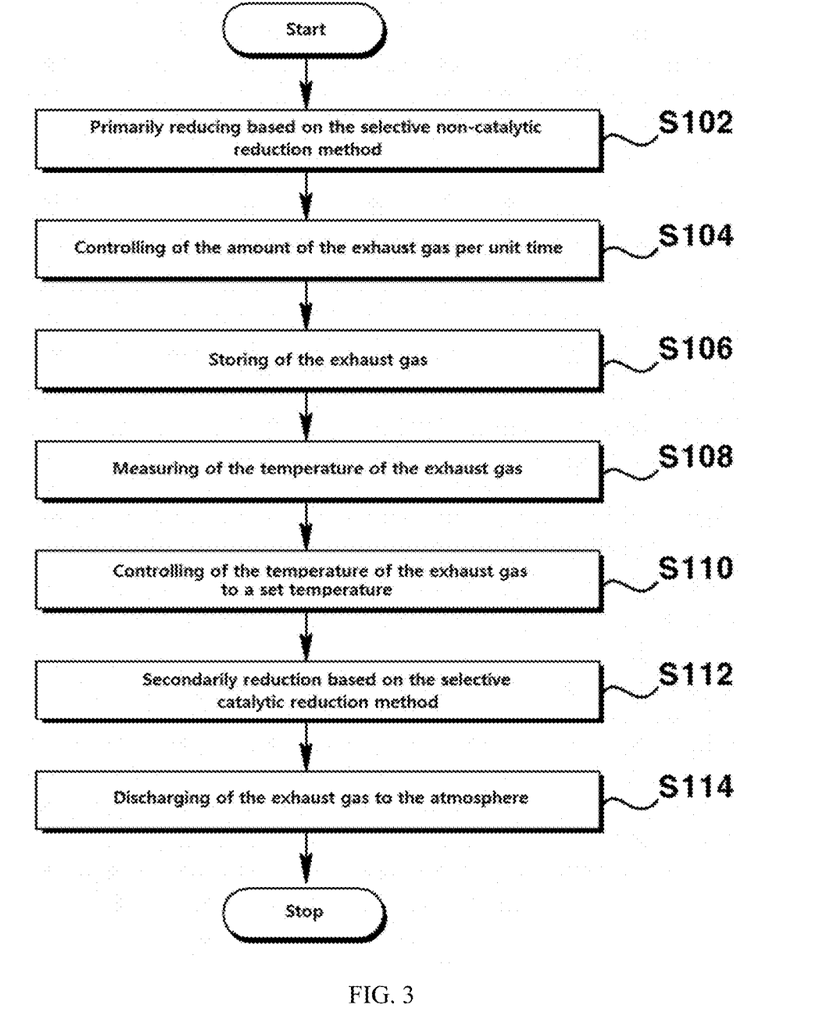
FIG. 3 is a flowchart illustrating a nitrogen oxide reduction method according to the present invention.

FIG. 3 is a flowchart illustrating a nitrogen oxide reduction method according to the present invention. The nitrogen oxide reduction method according to an embodiment of the present invention may be performed by the nitrogen oxide reduction type regenerative thermal oxidation system 100 shown in FIG. 2.

Referring to FIGS. 2 and 3, the first reduction device 120 primarily reduces nitrogen oxides generated by the regenerative combustion oxidation device 110 based on the selective non-catalytic reduction method (S102). Here, the regenerative combustion oxidation device 110 may use a regenerative combustion oxidation device according to a known technology, and a detailed description thereof will be omitted here.

The first reduction device 120 primarily reduces nitrogen oxides generated by the regenerative thermal oxidation device 110 based on the selective non-catalytic reduction method (S102). Here, the regenerative thermal oxidation device 110 may use a regenerative thermal oxidation device according to a known technology, and a detailed description thereof will be omitted here.

The first reduction device 120 may spray a reduction agent on the regenerative thermal oxidation device 110 so that the reduction reaction occurs for the reduction of nitrogen oxides through a plurality of atomizers (not shown) installed on the upper inner side wall of the regenerative thermal oxidation device 110 at the combustion temperature of 850~1,100° C. of the regenerative thermal oxidation device 110. In this case, the regenerative thermal oxidation device 110 operating at a high temperature reacts directly with the reduction agent being sprayed by the first reduction device 120 in which nitrogen oxide generated during combustion is primarily denitrified. At this time, the first reduction device 120 may select and change the type of the reduction agent in various ways, the spray rate of the reduction agent, the spray amount of the reduction agent, and the like, and through this, the nitrogen oxides denitrified in the regenerative thermal oxidation device 110. The first reduction device 120 selects and changes the type of reduction agent, the spray rate of the reduction agent, the spray amount of the reduction agent, and the like to vary the amount of nitrogen oxide to be denitrified using various known techniques, a detailed description thereof will be omitted here.

The emission control device 180 controls the amount of the exhaust gas being discharged from the regenerative thermal oxidation device 110 to the exhaust gas storage device 130 per unit time (S104). At this time, the emission control device 180 may control the amount of exhaust gas discharged from the regenerative thermal oxidation device 110 to the exhaust gas storage device 130 per unit time in consideration of the capacity of the gas accommodated in the regenerative thermal oxidation device 110, the capacity of the gas accommodated in the exhaust gas storage device 130, the processing time of the exhaust gas storage device 130, and the like.

The exhaust gas storage device 130 stores the exhaust gas being discharged from the regenerative thermal oxidation device 110 (S106). At this time, the exhaust gas storage device 130 stores the exhaust gas being discharged from the regenerative thermal oxidation device 110 until the amount of the exhaust gas becomes a set amount, or may store the exhaust gas being discharged from the regenerative thermal oxidation device 100 for a set time. At this time, the exhaust gas storage device 130 is the cooled exhaust gas after waste heat is recovered by the regenerative thermal oxidation device 110, and the temperature thereof may be 300° C. or less.

The temperature sensor 160 measures the temperature of the exhaust gas stored in the exhaust gas storage device 130 (S108).

When the temperature measured by the temperature sensor 160 is lower than the preset temperature, the temperature control device 170 controls the temperature of the exhaust gas stored in the exhaust gas storage device 130 to the preset temperature (S110). Here, it is preferable that the temperature control device 170 controls not only the temperature of the exhaust gas stored in the exhaust gas storage device 130 but also the time at which the exhaust gas reaches a set temperature by using a high heat generating filament. At this time, when the temperature measured by the temperature sensor 160 is lower than the preset set temperature, the temperature control device 170 controls the temperature it is controlled in a way that the exhaust gas stored in the exhaust gas storage device 130 reaches the set temperature within a set time. In this case, the temperature control device 170 may control the time for temperature control in consideration of the amount of exhaust gas, the difference between the exhaust gas and the set temperature, and the like. In addition, the time for temperature control may be controlled in stages according to whether the current temperature of the exhaust gas is lower than the temperature at which the chemical reaction to the reduction agent starts to occur. For example, 300° C. is set as the set temperature for the exhaust gas storage device 130, the current temperature of the exhaust gas measured by the temperature sensor 160 is 100° C., and when the temperature at which the chemical reaction to the reduction agent starts is 200° C., the temperature control device 170 may control the temperature of the exhaust gas in a way that the exhaust gas reaches 200° C. within 30 minutes, and after the exhaust gas reaches 200° C. it is reached to 300° C. within 10 minutes.

The second reduction device 140 secondarily reduces nitrogen oxides based on the selective catalytic reduction method for the exhaust gas being stored in the exhaust gas storage device 130 (S112). At this time, the second reduction device 140 supplies a small amount of a reduction agent to the exhaust gas storage device 130, and the exhaust gas storage device 130 may be utilized as a catalytic reaction tower used for the selective catalytic reduction method.

The second reduction device 140 may calculate the amount of the nitrogen compound contained in the exhaust gas being discharged from the regenerative thermal oxidation device 110 and the amount of the reduction agent consisting of ammonia or urea required for this according to the stoichiometric equivalence ratio. In this case, the second reduction device 140 may adjust the input flow rate, the input amount, and the like of the reduction agent according to the calculated result. The method for the second reduction device 140 to adjust the input flow rate, input amount, and the like of the reduction agent follows a known technique, and a detailed description thereof will be omitted here.

Here, the reduction agent effectively chemically reacts with nitrogen oxides of the exhaust gas discharged from the regenerative thermal oxidation device 110. At this time, it is preferable that the exhaust gas storage device 130 is formed in multiple stages to sufficiently ensure a residence time in which the chemical reaction of nitrogen oxide and the reduction agent can occur, and nitrogen oxide contained in the exhaust gas is reformed into nitrogen and oxygen.

The suction and discharge device 150 sucks the exhaust gas with secondarily reduced nitrogen oxides from the exhaust gas storage device 130 and discharges it to the atmosphere (S114). In other words, the suction and discharge device 150 sucks the exhaust gas reformed into nitrogen and oxygen from the exhaust gas storage device 130 and discharges it to the atmosphere through a chimney (not shown).

Although the embodiments according to the present invention have been described above, these are merely exemplary, and those of ordinary skill in the art will understand that various modifications and equivalent ranges of embodiments are possible therefrom. Accordingly, the protection scope of the present invention should be defined by the following claims as well as their equivalents.

We claim:

1. A nitrogen oxide reduction type regenerative thermal oxidation system comprising:
    a first reduction device for primarily reducing nitrogen oxides generated by a regenerative thermal oxidation device based on a selective non-catalytic reduction method;
    an exhaust gas storage device for storing the exhaust gas being discharged from the first reduction device;
    a second reduction device for secondarily reducing nitrogen oxides based on a selective catalytic reduction method for an exhaust gas stored in the exhaust gas storage device; and
    a suction and discharge device for sucking in the exhaust gas with secondarily reduced nitrogen oxides from the exhaust gas storage device and discharging it into the atmosphere,
    wherein the first reduction device sprays a reduction agent on the regenerative thermal oxidation device through a plurality of atomizers installed on the upper inner wall of the regenerative thermal oxidation device,
    wherein the exhaust gas storage device stores the cooled gas after waste heat is recovered by the regenerative thermal oxidation device,
    wherein the second reduction device supplies a reduction agent to the exhaust gas storage device, and adjusts the input flow rate and the input amount of the reduction agent according to the amount of the nitrogen compound contained in the exhaust gas being discharged from the regenerative thermal oxidation device, and
    wherein the suction and discharge device sucks the exhaust gas stored in the exhaust gas storage device.

2. The nitrogen oxide reduction type regenerative thermal oxidation system of claim 1, further comprising:
    a temperature sensor for measuring the temperature of an exhaust gas stored in the exhaust gas storage device; and
    a temperature control device for controlling the temperature of an exhaust gas stored in the exhaust gas storage device to the preset temperature when the temperature measured by the temperature sensor is lower than the preset temperature,
    wherein the temperature control device controls the time for temperature control based on the amount of exhaust gas, and the difference between the temperature of the exhaust gas and the set temperature.

3. The nitrogen oxide reduction type regenerative thermal oxidation system of claim 2, wherein when the temperature being measured by the temperature sensor is lower than a preset set temperature, the temperature control device controls the temperature so that the exhaust gas stored in the exhaust gas storage device reaches the set temperature within a set time.

4. The nitrogen oxide reduction type regenerative thermal oxidation system of claim 1, further comprising an emission control device for controlling the amount of exhaust gas discharged from the regenerative thermal oxidation device to the exhaust gas storage device per unit time,
    wherein the emission control device controls the amount of exhaust gas discharged from the regenerative thermal oxidation device to the exhaust gas storage device per unit time based on the capacity of the gas accommodated in the regenerative thermal oxidation device, the capacity of the gas accommodated in the exhaust gas storage device, and the processing time of the exhaust gas storage.

5. A nitrogen oxide reduction method being performed by a regenerative thermal oxidation system comprising the steps of:
    primarily reducing nitrogen oxides being generated by a regenerative thermal oxidation device based on a selective non-catalytic reduction method;
    storing an exhaust gas with reduced nitrogen oxides;
    secondarily reducing nitrogen oxides based on a selective catalytic reduction method for the exhaust gas that has been stored; and
    sucking an exhaust gas in which nitrogen oxides is secondarily reduced and discharging it into the atmosphere,
    wherein the step of secondarily reducing nitrogen oxides based on a selective catalytic reduction method for the exhaust gas that has been stored, supplies a reduction agent to the exhaust gas, and
    wherein the step of secondarily reducing nitrogen oxides based on a selective catalytic reduction method for the exhaust gas that has been stored, adjusts the input flow rate and the input amount of the reduction agent according to the amount of the nitrogen compound contained in the exhaust gas being discharged from the regenerative thermal oxidation device.

6. The method of claim 5, further comprising the steps of:
    measuring the temperature of the exhaust gas that has been stored; and
    controlling the temperature of the exhaust gas that has been stored to the set temperature when the temperature being measured is lower than a preset set temperature,
    wherein the step of controlling the temperature of the exhaust gas controls the time for temperature control based on the amount of exhaust gas, and the difference between the temperature of the exhaust gas and the set temperature.

7. The nitrogen oxide reduction method of claim 6, wherein when the measured temperature is lower than the preset set temperature, in the step of controlling the temperature of the exhaust gas, the temperature is controlled in a way that the exhaust gas that has been stored reaches the set temperature within a set time.

8. The nitrogen oxide reduction method of claim 5, further comprising a step of:
    controlling the amount of discharge of an exhaust gas being discharged from the regenerative thermal oxidation device per unit time,
    wherein the step of controlling the amount of discharge of an exhaust gas controls the amount of exhaust gas discharged from the regenerative thermal oxidation device per unit time.

* * * * *